(12) United States Patent
Matsuyama et al.

(10) Patent No.: US 9,382,071 B2
(45) Date of Patent: Jul. 5, 2016

(54) CHIP CONVEYOR

(71) Applicant: DMG MORI CO., LTD., Nara (JP)

(72) Inventors: Tomoyoshi Matsuyama, Nara (JP); Masahide Kakutani, Nara (JP); Takuya Kichibayashi, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 14/867,870

(22) Filed: Sep. 28, 2015

(65) Prior Publication Data

US 2016/0114981 A1 Apr. 28, 2016

(30) Foreign Application Priority Data

Oct. 28, 2014 (JP) .................................. 2014-219077

(51) Int. Cl.
*B65G 19/00* (2006.01)
*B65G 19/10* (2006.01)

(52) U.S. Cl.
CPC ...................................... *B65G 19/10* (2013.01)

(58) Field of Classification Search
CPC ........... B65G 2812/02891; B65G 2812/02881; B65G 2812/0293
USPC .......................................... 198/727, 729, 734
See application file for complete search history.

(56) References Cited

U.S. PATENT DOCUMENTS

| 2,154,707 | A | * | 4/1939 | Sinden | B65G 19/16 198/734 |
| 2,438,083 | A | * | 3/1948 | Whitney | B65G 19/16 198/729 |
| 2,465,287 | A | * | 3/1949 | Sinden | B65G 19/16 198/729 |
| 5,069,327 | A | * | 12/1991 | Stohr | B65G 19/28 198/725 |

FOREIGN PATENT DOCUMENTS

| JP | 04183553 A | 6/1992 |
| JP | 2014097544 A | 5/2014 |

* cited by examiner

*Primary Examiner* — James R Bidwell
(74) *Attorney, Agent, or Firm* — Miller, Matthias & Hull LLP

(57) ABSTRACT

A chip conveyor includes a pair of endless chains arranged in parallel, a drive mechanism turning the endless chains, a cover body having a chip receiving port and a chip discharge port at a beginning and an end of a forward path of the endless chains, respectively, scrapers connected to the endless chains therebetween, and a chip guide plate disposed along the endless chains to be in sliding contact with the scrapers. The chip guide plate is composed of a forward path corresponding part extending from the receiving port to the discharge port and a return path corresponding part bent toward a return path at the receiving port and extended along the return path. The scrapers are in sliding contact with both the return path corresponding part and a surface of the cover body facing the return path corresponding part when in sliding contact with the return path corresponding part.

16 Claims, 4 Drawing Sheets as the above-

CHIP CONVEYOR

BACKGROUND

1. Field of the Disclosure

The present disclosure relates to a chip conveyor for discharging chips produced in a machining region of a machine tool to the outside of the machine tool.

2. Background of the Disclosure

As described in Japanese Unexamined Patent Application Publication No. H04-183553, hinge-plate type and scraper type chip conveyors are conventionally known mentioned chip conveyor.

A hinge-plate type chip conveyor (conventional example 1) includes a pair of endless chains disposed in parallel in a horizontal direction, a large number of hinge plates continuously connected along a turning direction of the pair of endless chains and connected to the endless chains at both sides thereof, and scrapers erected at appropriate intervals on the hinge plates.

Meanwhile, a scraper type chip conveyor (conventional example 2) includes a pair of endless chains disposed in parallel in a horizontal direction, and a plurality of scrapers provided at appropriate intervals along a turning direction of the pair of endless chains and connected to the pair of endless chains so that they extend over the pair of endless chains.

The hinge-plate type chip conveyor of the conventional example 1 and the scraper type chip conveyor of the conventional example 2 have their respective merits and demerits; Japanese Unexamined Patent Application Publication No. H04-183553 additionally suggests a new scraper type chip conveyor (conventional example 3) which has been improved in the demerits of the scraper type chip conveyor.

This new scraper type chip conveyor has a configuration in which the scrapers are provided to project toward the inside of the endless chains and a chip guide plate is provided to separate the space defined by the endless chains into upper and lower spaces, and this chip conveyor is configured to convey chips put onto the chip guide plate, scraping them by the scrapers, and discharge them through a discharge port.

Thus, according to the scraper type chip conveyor of the conventional example 3, adhesion of powdery chips to the scrapers is prevented because coolant flows downward along the chip guide plate when chips are scraped upward on the chip guide plate. Further, even if curly chips are caught in the scrapers when chips are put onto the chip guide plate, entanglement of curly chips around the scrapers is prevented because the chips are shook off when the scrapers are reversed at the discharge port.

Further, conventionally, the above-described chip conveyors are not only used being set above a coolant tank but also used being immersed in a coolant tank as described in Japanese Unexamined Patent Application Publication No. 2014-097544. The chip conveyor disclosed in Japanese Unexamined Patent Application Publication No. 2014-097544 includes a circular cylindrical filter in a cover body and is configured to filter dirty coolant returned from the machining region of the machine tool and then discharge it to the outside.

SUMMARY OF THE DISCLOSURE

However, although the above-mentioned improvements can be expected for the scraper type chip conveyor of the conventional example 3, which was newly suggested in Japanese Unexamined Patent Application Publication No. H04-183553, because an opening is formed between an end of the chip guide plate and the cover body at the beginning of a conveyance path formed by cooperation of the chip guide plate and the scrapers, there is a problem that chips which are put onto the chip guide plate through an input port enter the space under the chip guide plate through the opening together with coolant and the chips having entered the space accumulate on the bottom of the cover body under the chip guide plate.

Although a return path of the pair of endless chains and the scrapers is formed in the space under the chip guide plate, the scrapers are not capable of conveying the chips having entered the space under the chip guide plate to the top surface of the chip guide plate forming a forward path of the endless chains and the scrapers; therefore, the chips having entered the space under the chip guide plate cannot be discharged and they stay and accumulate there. Accordingly, when a large amount of chips has entered and accumulated in the space under the chip guide plate, the running of the endless chains and the scrapers in the forward path is hindered, which in turn leads to breakdown of the chip conveyor.

Further, in a mode where this chip conveyor is used being immersed in a coolant tank and coolant in the cover body is purified by the filter disposed in the space under the chip guide plate as described in Japanese Unexamined Patent Application Publication No. 2014-097544, there is a problem that the filter becomes clogged in a short period of time when a large amount of chips has accumulated in the space under the chip guide plate, which prevents good and smooth operation.

The present disclosure has been achieved in view of the above-described circumstances, and an object thereof is to provide a chip conveyor capable of preventing accumulation of chips in a space under a chip guide plate.

The present disclosure, for solving the above-mentioned problems, relates to a chip conveyor including:

a pair of annular endless chains disposed in parallel in a horizontal direction;

a support mechanism supporting the pair of endless chains;

a drive mechanism turning the pair of endless chains;

a cover body covering at least the pair of endless chains and the support mechanism, having a receiving port in an upper surface thereof at a beginning of a forward path of the endless chains for receiving chips discharged from a machining region of a machine tool and having a discharge port at an end of the forward path for discharging the chips conveyed;

a plurality of scrapers disposed at predetermined intervals along the turning direction of the pair of endless chains and connected to the pair of endless chains to extend over the pair of endless chains; and a chip guide plate disposed along the pair of endless chains inside the endless chains to be in sliding contact with the scrapers and forming a chip conveyance path from the receiving port to the discharge port in cooperation with the scrapers, the chip guide plate being composed of a forward path corresponding part and a return path corresponding part, the forward path corresponding part being extended from a position corresponding to the receiving port to a position corresponding to the discharge port, the return path corresponding part being bent toward a return path of the pair of endless chains at the position corresponding to the receiving port and extended along the return path, and the scrapers being configured to be in sliding contact with both the return path corresponding part of the chip guide plate and a surface of the cover body facing the return path corresponding part in a path where they are in sliding contact with the return path corresponding part.

In the chip conveyor having the above-described configuration, when the pair of endless chains is turned by the drive mechanism, the plurality of scrapers connected to the endless chains turn together with the endless chains. The scrapers move in sliding contact with both the return path corresponding part of the chip guide plate and the surface of the cover body facing the return path corresponding part in an area where the return path corresponding part is located, and move in sliding contact with the forward path corresponding part of the chip guide plate in an area where the forward path corresponding part is located.

Thus, when chips and coolant discharged from a machining region of a machine tool are put into the cover body through the receiving port, most of the chips and coolant are put onto the forward path corresponding part of the chip guide plate positioned just below the receiving port, and the chips put thereon are conveyed to the discharge port by the scrapers moving in sliding contact with the forward path corresponding part, and discharged to the outside of the system through the discharge port.

On the other hand, a part of the chips put through the receiving port enter between the return path corresponding part of the chip guide plate and the cover body at downstream in the direction of the conveyance by the scrapers, and the coolant flows downstream along the forward path corresponding part of the chip guide plate from the forward path corresponding part and similarly flows in between the return path corresponding part of the chip guide plate and the cover body. However, the chips having entered between the return path corresponding part of the chip guide plate and the cover body are conveyed onto the forward path corresponding part by the scrapers moving in sliding contact with both the return path corresponding part and the cover body, and they are conveyed to the discharge port together with chips newly put onto the forward path corresponding part and are discharged to the outside of the system thorough the discharge port. Note that the coolant having flowed in between the return path corresponding part of the chip guide plate and the cover body is discharged to the outside of the system through an opening which is appropriately formed in the cover body.

Thus, according to this chip conveyor, chips entering between the return path corresponding part of the chip guide plate and the cover body at downstream in the conveyance direction can be certainly conveyed to the discharge port and discharged to the outside of the system through the discharge port by the scrapers moving in sliding contact with both the return path corresponding part and the cover body; therefore, it is possible to keep the inside of the cover body clean with no retention or accumulation of chips for a long period of time. Therefore, it is possible to operate the chip conveyor in a good and smooth manner for a long period of time, and it is possible to make the chip conveyor so-called maintenance-free.

Further, in the present disclosure, it is preferred that the plurality of scrapers are disposed at intervals that allows one scraper to be brought into sliding contact with the forward path corresponding part of the chip guide plate after a subsequent scraper is brought into sliding contact with the return path corresponding part of the chip guide plate. In this arrangement of the scrapers, when one scraper is brought into sliding contact with the forward path corresponding part of the chip guide plate and thereby chips can enter downstream of the scraper, a subsequent scraper has been brought into sliding contact with both the return path corresponding part and the cover body, and therefore chips entering between the return path corresponding part and the cover body are dammed by the subsequent scraper and do not move downstream of the scraper. Therefore, according to this configuration, it is possible to certainly prevent retention and accumulation of chips in the cover body.

Further, in the present disclosure, it is preferred that each of the scrapers has side plates provided on both ends thereof connected to the pair of endless chains, the side plates being extended in the turning direction from the ends. According to this configuration, chips can be easily caught by the scrapers and the chips can be conveyed in a stable manner and discharged through the discharge port.

Further, in the present disclosure, it is preferred that each of the scrapers has a plurality of through holes formed therein. In this configuration, when the scrapers move in sliding contact with both the return path corresponding part and the cover body, coolant passes through the through holes and thereby resistance generated by the coolant is reduced; therefore, it is possible to reduce a power load for moving the pair of endless chains and the scrapers. Further, coolant passes through the through holes also when the scrapers convey chips toward the discharge port in sliding contact with the forward path corresponding part; therefore, it is possible to reduce the amount of coolant discharged (took out) through the discharge port together with chips.

Further, in the present disclosure, it is preferred that both sides of the chip guide plate are fixed on an inner surface of the cover body in a liquid-tight manner. In this configuration, it is possible to prevent chips from entering an inner space defined by the chip guide plate and the cover body through gaps between both sides of the chip guide plate and the cover body.

As described above, according to the chip conveyor of the present disclosure, chips entering between the return path corresponding part of the chip guide plate and the cover body at downstream in the conveyance direction can be certainly conveyed to the discharge port and discharged to the outside of the system through the discharge port by the scrapers moving in sliding contact with both the return path corresponding part and the cover body; therefore, it is possible to keep the inside of the cover body clean with no retention or accumulation of chips for a long period of time. Therefore, it is possible to operate the chip conveyor in a good and smooth manner for a long period of time, and it is possible to make the chip conveyor so-called maintenance-free.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Figure 1:
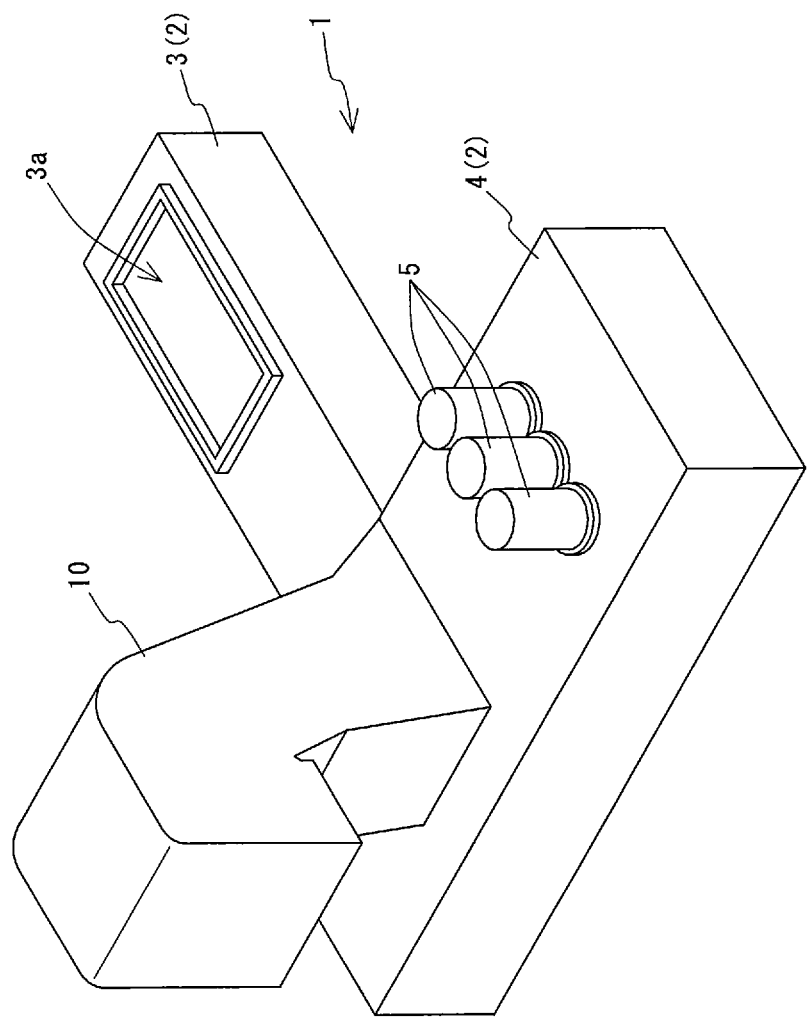
FIG. 1 is a perspective view of a coolant supply apparatus according to an embodiment of the present disclosure.

A specific embodiment of the present disclosure will be described below with reference to the drawings. FIG. 1 is a perspective view of a coolant supply apparatus according to the embodiment and FIG. 2 is a vertical sectional view of a chip conveyor according to the embodiment.

As shown in FIG. 1, a coolant supply apparatus 1 of the embodiment includes a coolant tank 2 having a T shape in plan view and composed of a dirty tank 3 and a clean tank 4 which communicate with each other, three supply pumps 5 provided on the clean tank 4, and a chip conveyor 10 disposed in the coolant tank 2 to extend over the dirty tank 3 and the clean tank 4. Note that the dirty tank 3 and the clean tank 4 are separated in a liquid-tight manner.

Figure 2:
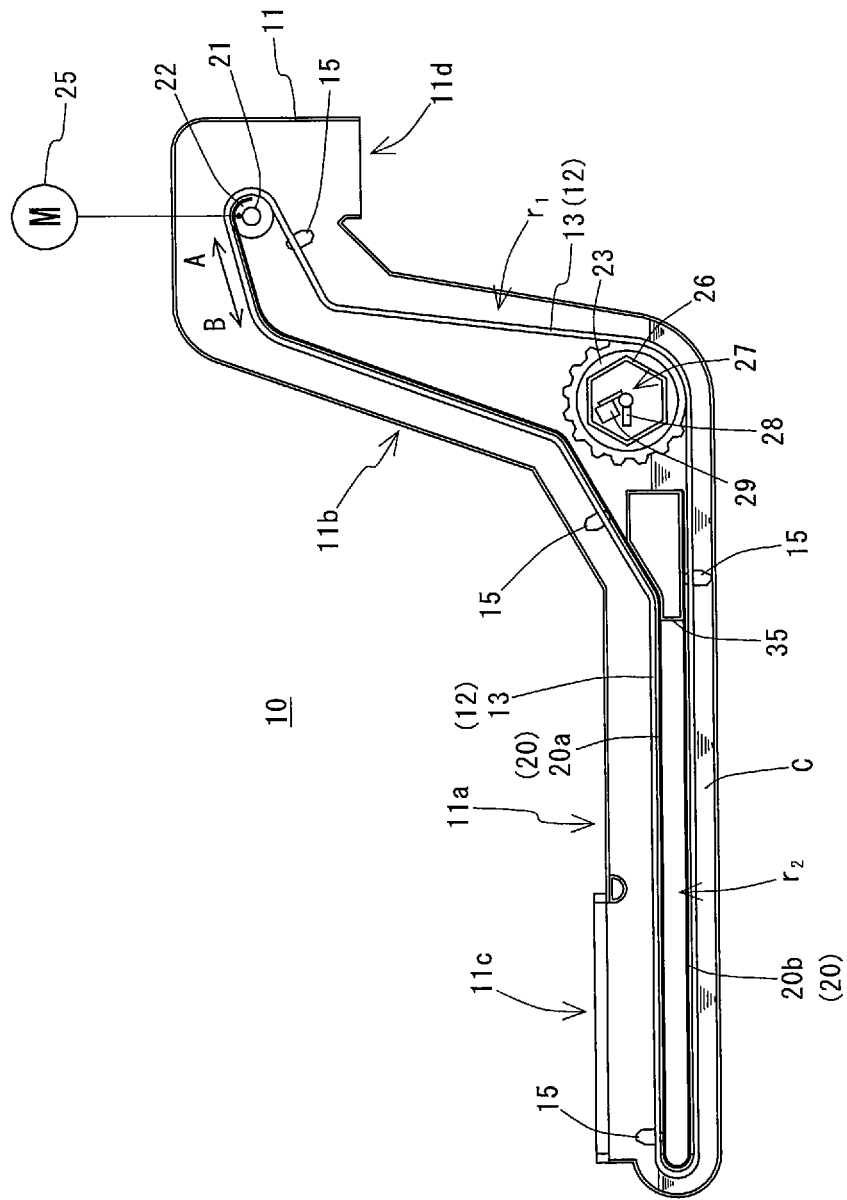
FIG. 2 is a vertical sectional view of a chip conveyor according the embodiment.

As shown in FIG. 2, the chip conveyor 10 includes a cover body 11, and driving sprockets 22, driven sprockets 23, a pair of annular endless chains 12, 13, scrapers 15, a chip guide plate 20, a filter 26 and a cleaning mechanism 27, which are disposed in the cover body 11, as well as a drive motor 25 and other components.

The cover body 11 is composed of a horizontal part 11a and a rising part 11b, and has a laterally inverted L shape in font view. Further, the cover body 11 has a receiving port 11c formed in an upper surface thereof at a left end of the horizontal part 11a, and has a discharge port 11d formed in a lower surface thereof at a right end of the rising part 11b; the internal space of the cover body 11 communicates with the external space through the receiving port 11c and the discharge port 11d.

The driving sprockets 22 are provided on both ends of a rotary shaft 21 rotatably disposed above the discharge port 11d, and they rotate about their respective axes together with the rotary shaft 21 driven by the drive motor 25. Further, the driven sprockets 23 are provided on both ends of the filter 26, which will be described in detail later, and they are disposed at an intersection of the horizontal part 11a and the rising part 11b. Further, the driven sprockets 23 each have a boss portion 24 formed on an outer side thereof (see FIG. 4) and the boss portion 24 is supported by a bearing provided on the cover body 11, and therefore they are rotatable about their respective axes.

The endless chains 12, 13 are arranged in parallel with a predetermined spacing between them in a horizontal direction perpendicular to the sheet in FIG. 2 and are wound around the driving sprockets 22 and the driven sprockets 23, and they are disposed so that their left ends are positioned below the receiving port 11c.

Thus, when the driving sprockets 22 are rotated in a normal rotation direction by the drive motor 25, the endless chains 12, 13 turn in the arrow A direction (forward direction). On the other hand, when the driving sprockets 22 are rotated in a reverse rotation direction, the endless chains 12, 13 turn in the arrow B direction (backward direction).

Note that the turning (running) of the endless chains 12, 13 is guided by an appropriate guide or the like (not shown) provided in the cover body 11. Further, in the case where the endless chains 12, 13 turn in the arrow A direction (forward direction), a path from a position corresponding to the receiving port 11c to the driving sprockets 22 is regarded as a forward path and a path from the driving sprockets 22 to the receiving port 11a is regarded a return path. On the other hand, in the case where the endless chains 12, 13 turn in the arrow B direction (backward direction), a path from the driving sprockets 22 to the position corresponding to the receiving port 11a is regarded a forward path and a path from the receiving port 11a to the driving sprockets 22 is regarded as a return path.

The chip guide plate 20 is disposed along the pair of endless chains 12, 13 with a predetermined spacing from the endless chains 12, 13 inside the endless chains 12, 13, and is composed of a forward path corresponding part 20a extended from a position corresponding to the receiving port 11c to a position above the rotary shaft 21 and a return path corresponding part 20b bent toward the bottom of the cover body 11 at the position corresponding to the receiving port 11c and extended along the bottom of the cover body 11. Further, both sides of the chip guide plate 20 are each fixed on an inner side surface of the cover body 11 in a liquid-tight manner by a machine screw or the like with an appropriate packing interposed therebetween.

Thus, the rotary shaft 21, the driving sprockets 22, the driven sprockets 23, the chip guide plate 20, the guide (not shown) and other components form a support mechanism for causing the endless chains 12, 13 to turn in a predetermined path.

Figure 3:
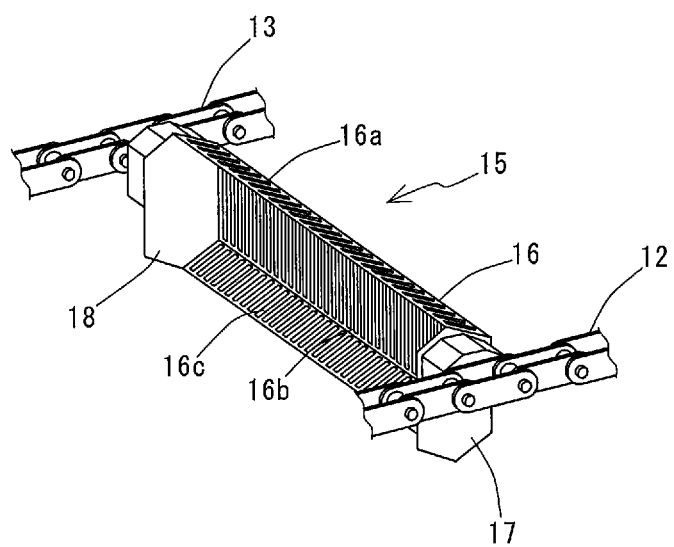
FIG. 3 is a perspective view of a pair of endless chains and a scraper according to the embodiment.

As shown in FIG. 3, each of the scrapers 15 is a bucket-shaped member and is composed of a main plate 16 of a C-shaped cross section and side plates 17, 18 provided to close both sides of the main plate 16; the main plate 16 has slit-shaped through holes 16a, 16b, 16c which are respectively formed in three surfaces thereof. The scrapers 5 (4 scrapers in this embodiment) are provided at regular intervals along the turning direction of the pair of endless chains 12, 13 and they have their respective open sides facing in the arrow A direction and are connected to the pair of endless chains 12, 13 to extend over them.

Further, the scrapers 15 turn together with the endless chains 12, 13 in sliding contact with the chip guide plate 20, and form a chip conveyance path in cooperation with the chip guide plate 20 by turning in such a manner. Note that, in a path where the scrapers 15 are in sliding contact with the return path corresponding part 20b of the chip guide plate 20, the scrapers 15 are also in sliding contact with a surface of the cover body 11 facing the return path corresponding part 20b.

Further, the intervals at which the scrapers 15 are provided are such that one scraper 15 is allowed to be brought into sliding contact with the forward path corresponding part 20a of the chip guide plate 20 after a subsequent scraper 15 is brought into sliding contact with the return path corresponding part 20b of the chip guide plate 20 (see FIG. 2).

The filter 26 is a hollow cylindrical filter configured by providing a filter material on each of the surfaces of a hexagonal cylindrical frame, and, as described above, the filter 26 has the driven sprockets 23 fixed on both ends thereof and rotates integrally with the driven sprockets 23. Further, both ends of the filter 26 communicate with the clean tank 4 through openings formed in the driven sprockets 23.

The cleaning mechanism 27 includes a plurality of nozzles 28 disposed in the longitudinal direction of the filter 26 inside the filter 26 and supported by an appropriate non-rotary member 29. Coolant C in the clean tank 4 is supplied to the nozzles 28 through an appropriate supply pipe (not shown) from the supply pumps 5, and the coolant C is discharged toward the inner surfaces of the filter 26 from the nozzles 28.

Further, an opening 3a is formed in an upper surface of the dirty tank 3 at a portion corresponding to the receiving port 11c of the cover body 11 and the inside of the cover body 11 is connected to the outside through the opening 3a and the receiving port 11c.

Further, a partition member 35 is provided at a position between the driven sprockets 23 and the receiving port 11c in the horizontal part 11a of the cover body 11. The partition member 35 is connected to the reverse side of the forward path corresponding part 20a of the chip guide plate 20, an upper surface of an end portion (an upper surface of a rear end portion in the arrow A direction) of the return path corresponding part 20b, and both inner side surfaces of the cover body 11; it is connected to each of them in a liquid-tight manner by a machine screw or the like with an appropriate packing interposed therebetween. Thus, the internal space of the cover body 11 is separated in two spaces: a space $r_2$ surrounded by the chip guide plate 20 and the partition member 35 and the other space $r_1$.

The coolant supply apparatus 1 of the present embodiment having the above-described configuration is used, for example, in a state of being disposed so that the opening 3a is positioned below a machining region of a machine tool. Coolant C is supplied into the machine tool through an appropriate supply pipe (not shown) from the supply pumps 5, and the supplied coolant C passes through the machining region and is collected into the chip conveyor 10 together with chips produced in the machining region through the opening 3a and the receiving port 11a of the chip conveyor 10 positioned below the machining region.

Figure 4:
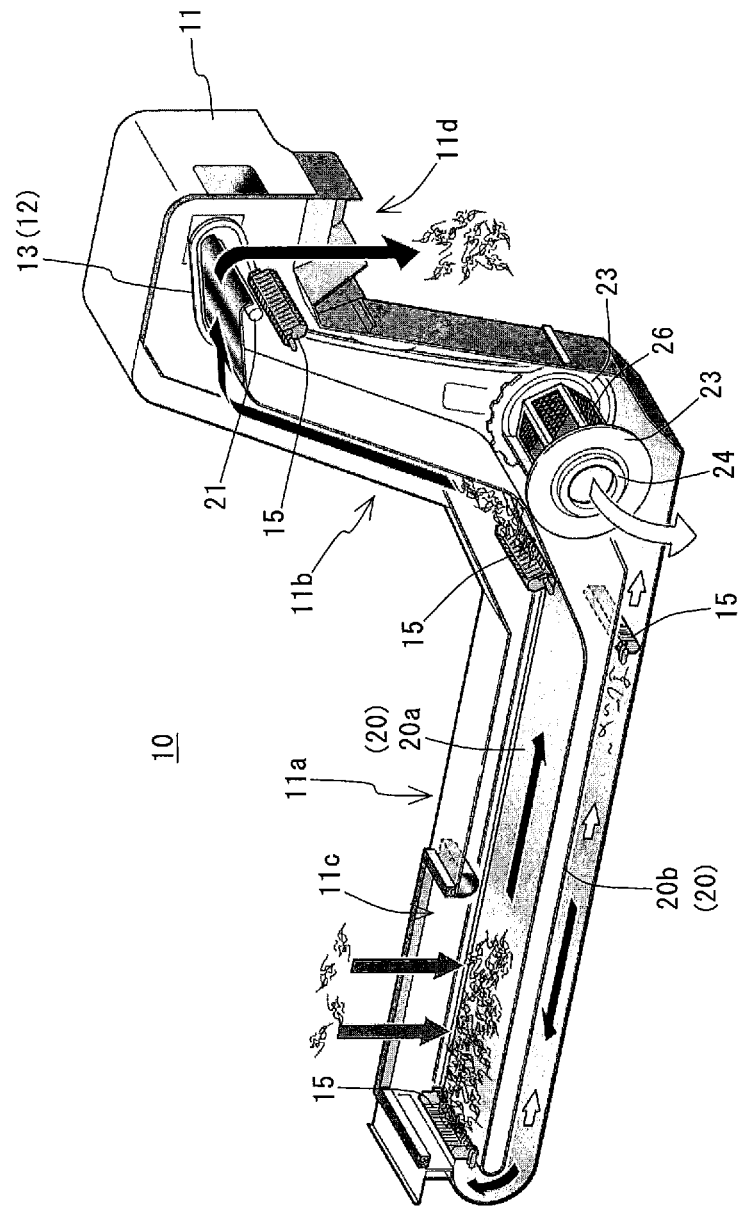
FIG. 4 is an illustration for explaining how the chip conveyor according to the embodiment operates.

When the chip conveyor 10 is used in an ordinary manner, the driving sprockets 22 are rotated in the normal rotation direction by the drive motor 25, and thereby the endless chains 12, 13 and the scrapers 15 turn in the arrow A direction and the chip guide plate 20 with which the scrapers 15 are in sliding contact forms a chip conveyance path in the arrow A direction in cooperation with the scrapers 15. In FIG. 4, the conveyance path is indicated by black arrows.

As for the chips and coolant C collected into the chip conveyor 10, most of the chips are put onto the forward path corresponding part 20a of the chip guide plate 20 positioned just below the receiving port 11c, and then, as shown in FIG. 4, they are pushed by the scrapers 15 turning in the arrow A direction (conveyance direction) in sliding contact with the forward path corresponding part 20a, thereby being conveyed toward the discharge port 11d on the forward path corresponding part 20a and collected into a chip bucket (not shown) or the like disposed below the discharge port 11d through the discharge port 11d.

On the other hand, a part of the chips put onto the chip guide plate 20 through the receiving port 11c flows downstream in the conveyance direction of the scrapers 15 along the forward path corresponding part 20a of the chip guide plate 20 from the forward path corresponding part 20a together with the coolant C, and flows in between the return path corresponding part 20b of the chip guide plate 20 and the bottom of the cover body 11; however, these chips are conveyed onto the forward path corresponding part 20a by subsequent scrapers 15 moving in sliding contact with both the return path corresponding part 20b and the bottom of the cover body 11 and conveyed to the discharge port 11d together with chips newly put onto the forward path corresponding part 20a, and they are discharged to the outside of the system through the discharge port 11d.

Meanwhile, the coolant C having flowed in between the return path corresponding part 20b and the bottom of the cover body 11 is filtered and purified by the filter 26, and then flows into the clean tank 4 from both ends of the filter 26 through the openings of the driven sprockets 23. In FIG. 4, the flow path of the coolant C is indicated by white arrows.

Note that, if the coolant C is present on the turning path of the scrapers 15, the coolant C is resistance to the movement of the scrapers 15. However, in the present embodiment, the slit-shaped through holes 16a, 16b, 16c are formed in the main plate 16 of each of the scrapers 15 and therefore the coolant C passes through the through holes 16a, 16b, 16c as the scrapers 15 move; therefore, resistance generated by the coolant C can be reduced and it is possible to reduce a load on the drive motor 25 for moving the endless chains 12, 13 and the scrapers 15. Further, in this configuration, the amount of coolant C conveyed to the discharge port 11d can be made very small; therefore, it is possible to minimize the amount of coolant C discharged (took out) though the discharge port 11d.

Further, in this embodiment, as shown in FIGS. 2 to 4, the scrapers 15 are disposed at intervals that allows one scraper 15 to be brought into sliding contact with the forward path corresponding part 20a of the chip guide plate 20 after a subsequent scraper 15 is brought into sliding contact with the return path corresponding part of the chip guide plate; therefore, when one scraper 15 is brought into sliding contact with the forward path corresponding part 20a of the chip guide plate 20 and thereby chips can enter downstream of the scraper 15, a subsequent scraper 15 has been brought into sliding contact with both the return path corresponding part 20b and the bottom of the cover body 11, and therefore the chips entering between the return path corresponding part 20b and the cover body 11 are dammed by the subsequent scraper 15 and do not flow downstream of the scraper 15. Therefore, it is possible to certainly prevent retention and accumulation of chips in the cover body 11.

As described above, according to the chip conveyor 10 of this embodiment, since chips entering between the return path corresponding part 20b of the chip guide plate 20 and the cover body 11 at downstream in the conveyance direction can be certainly conveyed to the discharge port 11d and discharged to the outside of the system through the discharge port 11d by the scrapers 15 moving in sliding contact with both the return path corresponding part 20b and the cover body 11, it is possible to keep the inside of the cover body 11 clean with no retention or accumulation of chips for a long period of time. Therefore, it is possible to operate the chip conveyor 10 in a good and smooth manner for a long period of time, and it is possible to make the chip conveyor 10 so-called maintenance-free.

Further, in this embodiment, since each of the scrapers 15 is formed by providing the side plates 17, 18 on the main plate 16, chips can be easily caught and the chips can be conveyed in a stable manner and discharged through the discharge port 11d.

Further, in this embodiment, since both sides of the chip guide plate 20 are fixed on the inner side surfaces of the cover body 11 in a liquid-tight manner, it is possible to prevent chips from entering an inner space defined by the chip guide plate 20 and the cover body 11 through gaps between both sides of the chip guide plate 20 and the cover body 11, and therefore it is possible to more certainly prevent retention and accumulation of chips in the space. Further, since the partition member 35 separates the internal space of the cover body 11 into two spaces: the space $r_2$ surrounded by the chip guide plate 20 and the partition member 35 and the other space $r_1$, in a liquid-tight manner, it is possible to prevent coolant C and chips from entering the space $r_2$ which is relatively difficult to maintain, and therefore it is possible to facilitate maintenance of the chip conveyor 10.

Note that powdery chips are mixed in the coolant C, and therefore the filter 26 becomes clogged as the filtering progresses. However, in such a case, the filter 26 can be purified (backwashed) and recovered by discharging coolant C in the clean tank 4 toward the inner surfaces of the filter 26 from the nozzles 28 of the cleaning mechanism 27.

Thus, a specific embodiment of the present disclosure has been described above; however, the present disclosure is not limited to this embodiment.

For example, although, in the above embodiment, the scrapers 15 have a bucket shape, the present disclosure is not limited thereto and scrapers of a simple plate shape may be used. Plate-shaped scrapers are inferior to the bucket-shaped scrapers in the ability of catching chips and the stability in conveyance; however, such scrapers also can convey chips well enough.

Further, although, in the above embodiment, the scrapers 15 have the slit-shaped through holes 16a, 16b, 16c formed therein, the shape of the through holes is not limited to a slit shape and the though holes may have a simple circular shape.

What is claimed is:

1. A chip conveyor comprising:
a pair of annular endless chains disposed in parallel in a horizontal direction;
a support mechanism supporting the pair of endless chains;
a drive mechanism turning the pair of endless chains;
a cover body covering at least the pair of endless chains and the support mechanism, having a receiving port formed in an upper surface thereof at a beginning of a forward path being an upper moving path of the endless chains for receiving chips discharged from a machining region of a machine tool and having a discharge port at an end of the forward path for discharging the chips conveyed;
a plurality of scrapers disposed at predetermined intervals along a turning direction of the pair of endless chains and connected to the pair of endless chains to extend over the pair of endless chains; and
a chip guide plate disposed along the pair of endless chains inside the endless chains to be in sliding contact with the scrapers and forming a chip conveyance path from the receiving port to the discharge port in cooperation with the scrapers,
the chip guide plate being composed of a forward path corresponding part and a return path corresponding part, the forward path corresponding part being extended from a position corresponding to the receiving port to a position corresponding to the discharge port, the return path corresponding part being bent toward a return path being a lower moving path of the pair of endless chains at the position corresponding to the receiving port and extended along the return path, and
each of the scrapers being configured to be independently in sliding contact with both the return path corresponding part of the chip guide plate and a surface of the cover body facing the return path corresponding part of the chip guide plate simultaneously in a path where each scraper is in sliding contact with the return path corresponding part.

2. The chip conveyor according to claim 1, wherein the plurality of scrapers are disposed at intervals to allow one scraper to be brought into sliding contact with the forward path corresponding part of the chip guide plate after a subsequent scraper is independently brought into sliding contact with both the return path corresponding part of the chip guide plate and the surface of the cover body facing the return path corresponding part simultaneously.

3. The chip conveyor according to claim 1, wherein each of the scrapers has side plates provided on both ends thereof connected to the pair of endless chains, the side plates being extended in the turning direction from the ends.

4. The chip conveyor according to claim 2, wherein each of the scrapers has side plates provided on both ends thereof connected to the pair of endless chains, the side plates being extended in the turning direction from the ends.

5. The chip conveyor according to claim 1, wherein each of the scrapers has a plurality of through holes formed therein, the through holes having a penetrating direction along the turning direction of the pair of endless chains.

6. The chip conveyor according to claim 2, wherein each of the scrapers has a plurality of through holes formed therein, the through holes having a penetrating direction along the turning direction of the pair of endless chains.

7. The chip conveyor according to claim 3, wherein each of the scrapers has a plurality of through holes formed therein, the through holes having a penetrating direction along the turning direction of the pair of endless chains.

8. The chip conveyor according to claim 4, wherein each of the scrapers has a plurality of through holes formed therein, the through holes having a penetrating direction along the turning direction of the pair of endless chains.

9. The chip conveyor according to claim 1, wherein both sides of the chip guide plate are fixed on an inner surface of the cover body in a liquid-tight manner.

10. The chip conveyor according to claim 2, wherein both sides of the chip guide plate are fixed on an inner surface of the cover body in a liquid-tight manner.

11. The chip conveyor according to claim 3, wherein both sides of the chip guide plate are fixed on an inner surface of the cover body in a liquid-tight manner.

12. The chip conveyor according to claim 4, wherein both sides of the chip guide plate are fixed on an inner surface of the cover body in a liquid-tight manner.

13. The chip conveyor according to claim 5, wherein both sides of the chip guide plate are fixed on an inner surface of the cover body in a liquid-tight manner.

14. The chip conveyor according to claim 6, wherein both sides of the chip guide plate are fixed on an inner surface of the cover body in a liquid-tight manner.

15. The chip conveyor according to claim 7, wherein both sides of the chip guide plate are fixed on an inner surface of the cover body in a liquid-tight manner.

16. The chip conveyor according to claim 8, wherein both sides of the chip guide plate are fixed on an inner surface of the cover body in a liquid-tight manner.

* * * * *